(12) United States Patent
Martz et al.

(10) Patent No.: US 11,965,776 B2
(45) Date of Patent: Apr. 23, 2024

(54) SYSTEM AND METHOD FOR QUANTIFYING AN EXPOSURE DOSE ON SURFACES

(71) Applicant: B/E Aerospace, Inc., Winston-Salem, NC (US)

(72) Inventors: Thomas Martz, Winston-Salem, NC (US); John D. Edquist, Milwaukee, WI (US); David C. McConnell, Annalong (GB); Steven Poteet, Ashland, MA (US); Katherine Urena Pimentel, Manchester, CT (US)

(73) Assignee: B/E AEROSPACE, INC., Winston-Salem, NC (US)

( * ) Notice: Subject to any disclaimer, the term of this patent is extended or adjusted under 35 U.S.C. 154(b) by 392 days.

(21) Appl. No.: 17/398,262

(22) Filed: Aug. 10, 2021

(65) Prior Publication Data

US 2023/0046956 A1 Feb. 16, 2023

(51) Int. Cl.

| | |
|---|---|
| *G01J 1/58* | (2006.01) |
| *B64D 47/02* | (2006.01) |
| *B64D 47/08* | (2006.01) |
| *H04N 23/71* | (2023.01) |
| *H04N 23/74* | (2023.01) |
| *H04N 23/80* | (2023.01) |

(52) U.S. Cl.
CPC .............. *G01J 1/58* (2013.01); *B64D 47/02* (2013.01); *B64D 47/08* (2013.01); *H04N 23/71* (2023.01); *H04N 23/74* (2023.01); *H04N 23/80* (2023.01)

(58) Field of Classification Search
CPC .......... G01J 1/58; H04N 23/80; H04N 23/74; H04N 23/71
See application file for complete search history.

(56) References Cited

U.S. PATENT DOCUMENTS

| | | |
|---|---|---|
| 6,864,489 B2 | 3/2005 | Chen et al. |
| 7,038,220 B2 | 5/2006 | Ishidoya |
| (Continued) | | |

FOREIGN PATENT DOCUMENTS

| | | |
|---|---|---|
| CN | 201107254 | 8/2008 |
| CN | 102175427 B | 6/2013 |
| (Continued) | | |

OTHER PUBLICATIONS

Buonanno Manuela et al., "Far-UVC light (222-nm) efficiently and safety inactivates airborne human coronaviruses", Scientific Reports, vol. 10, No. 1, Dec. 2, 2020.
(Continued)

*Primary Examiner* — Hugh Maupin
(74) *Attorney, Agent, or Firm* — Suiter Swantz pc llo

(57) ABSTRACT

A method for quantifying an exposure dose for a surface is disclosed. The method may include emitting one or more beams of 222 nm light onto a portion of the surface using one or more far ultraviolet (UV) light sources capable of emitting 222 nm light, the portion of the surface being coated with one or more fluorescent coatings. The method may include capturing images of the portion of the surface. The method may include adjusting one or more image characteristics for the captured images using one or more filtering methods. The method may include generating a histogram of the adjusted images based on the one or more filtering methods. The method may include determining a pixel surface area for the generated histogram. The method may include calculating the exposure dose for the surface based on the generated pixel surface area and a predetermined calibration curve.

13 Claims, 6 Drawing Sheets

(56) References Cited

U.S. PATENT DOCUMENTS

| | | | |
|---|---|---|---|
| 9,297,759 B2 | 3/2016 | Ahner et al. | |
| 10,837,770 B2 | 11/2020 | Jensen et al. | |
| 11,313,726 B1* | 4/2022 | Gant | G01J 1/50 |
| 2011/0057120 A1 | 3/2011 | Ostendarp et al. | |
| 2014/0179212 A1 | 6/2014 | Space et al. | |
| 2018/0369440 A1* | 12/2018 | Dytioco | A61L 2/28 |
| 2019/0298875 A1 | 10/2019 | Childress et al. | |
| 2021/0228757 A1* | 7/2021 | Vasefi | G01N 21/6456 |
| 2022/0023468 A1* | 1/2022 | Sears | B64D 11/00 |
| 2022/0047743 A1* | 2/2022 | Miller | A61L 2/10 |
| 2023/0107906 A1* | 4/2023 | Ramirez-Fort | A61N 2/02 |
| | | | 607/88 |

FOREIGN PATENT DOCUMENTS

| | | | |
|---|---|---|---|
| CN | 104792411 A | 7/2015 | |
| EP | 3657141 A1 | 5/2020 | |
| ES | 1254354 U | 10/2020 | |
| WO | 2017100398 A1 | 6/2017 | |

OTHER PUBLICATIONS

Buonanno Manuela et al., "Germicidal Efficacy and Mammalian Skin Safety of 222-nm UV Light", Radiation Research, vol. 187, No. 4, Apr. 2, 2017, pp. 493-501.

Extended European Search Report dated Jan. 9, 2023 for European Application No. 22189595.6 filed Aug. 9, 2022.

* cited by examiner

SYSTEM AND METHOD FOR QUANTIFYING AN EXPOSURE DOSE ON SURFACES

BACKGROUND

Far ultraviolet (UV) light is effective at deactivating microbes on a surface based on the amount of light that hits the surface.

SUMMARY

A system for quantifying an exposure dose on a surface is disclosed, in accordance with one or more embodiments of the present disclosure. The system includes one or more far ultraviolet (UV) light sources configured to emit one or more beams of 222 nm light onto the surface, the surface being coated with one or more fluorescent coatings. The system includes one or more image detection devices configured to capture one or more images of the surface when the one or more beams of 222 nm light from the one or more far UV light sources hit the surface. The system includes one or more controllers communicatively coupled to the one or more image detection devices, the one or more controllers including one or more processors and memory, the one or more processors including a set of program instructions stored in memory, the set of program instructions configured to cause the one or more processors to: adjust one or more image characteristics for the one or more captured images using one or more filtering methods; generate a histogram of the one or more adjusted images based on the one or more filtering methods; determine a pixel surface area for the generated histogram; and calculate the exposure dose for the surface based on the generated pixel surface area and a predetermined calibration curve.

In some embodiments, the one or more filtering methods may include adjusting at least one of: brightness, saturation, or hue.

In some embodiments, the predetermined calibration curve may be generated using a meter device.

In some embodiments, the one or more light sources may be integrated with a portion of an aircraft cabin.

In some embodiments, the one or more light sources may be integrated with a portion of a lavatory of the aircraft cabin.

In some embodiments, the one or more light sources may be integrated with an overhead portion above an aircraft seat of the aircraft cabin.

In some embodiments, the one or more image detection devices may include one or more cameras.

In some embodiments, the one or more cameras include one or more mobile device cameras.

A method for quantifying an exposure dose for a surface is disclosed, in accordance with one or more embodiments of the present disclosure. The method includes emitting one or more beams of 222 nm light onto a portion of the surface using one or more far ultraviolet (UV) light sources capable of emitting 222 nm light, the portion of the surface being coated with one or more fluorescent coatings. The method includes capturing one or more images of the portion of the surface. The method includes adjusting one or more image characteristics for the one or more captured images using one or more filtering methods. The method includes generating a histogram of the one or more adjusted images based on the one or more filtering methods. The method includes determining a pixel surface area for the generated histogram. The method includes calculating the exposure dose for the surface based on the generated pixel surface area and a predetermined calibration curve.

In some embodiments, the one or more filtering methods may include adjusting at least one of: brightness, saturation, or hue.

In some embodiments, the predetermined calibration curve may be generated using a meter device.

In some embodiments, the method further includes adjusting a position of at least one of the one or more light sources based on the calculated exposure dose.

In some embodiments, the one or more light sources may be integrated with a portion of an aircraft cabin.

In some embodiments, the one or more light sources may be integrated with a portion of a lavatory of the aircraft cabin.

In some embodiments, the one or more light sources may be integrated with an overhead portion above an aircraft seat of the aircraft cabin.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
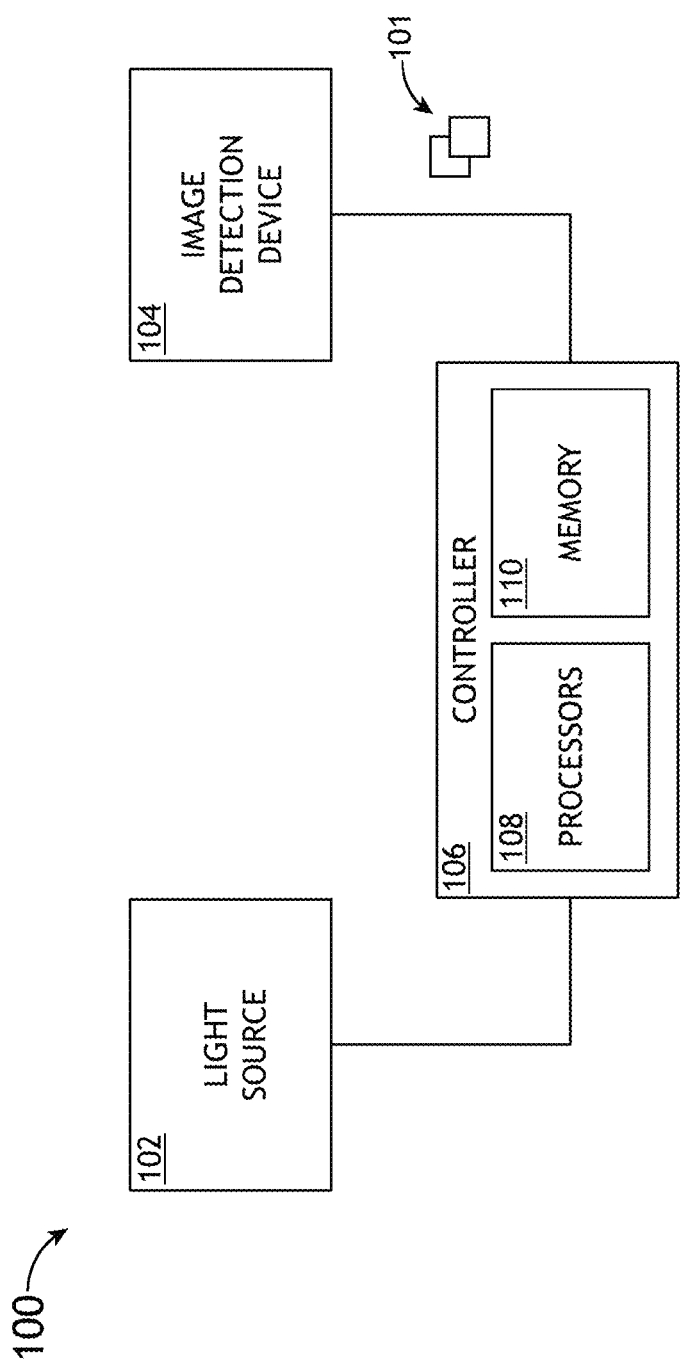
FIG. 1 illustrates a simplified block diagram of a system for quantifying an exposure dose on surfaces, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-6 in general illustrate a system and method for quantifying an exposure dose on surfaces, in accordance with one or more embodiments of the disclosure.

Far ultraviolet (UV) light (e.g., 222 nm light) is effective at deactivating microbes on a surface based on the amount of far UV light that hits the surface. As the distance between the far UV light source and the surface increases, the exposure dose (e.g., $mj/cm^2$) decreases and thus, the effectiveness decreases. Conventional methods to determine the exposure dose of light are inaccurate and time consuming. For example, computer simulation may be used, however, this method of detection relies on assumptions and only generates an approximation. Further, handheld meters may be used to determine an exposure dose for small areas on a surface and then an approximation is made based on the exposure doses of each small area for the entire surface.

As such, it would be desirable to provide a system and method for quantifying an exposure dose on surfaces. The exposure dose calculated by the system and method should be accurate. The exposure dose calculated by the system and method may be used to adjust a position (or angle) of the light source to ensure that the exposure dose is effective at deactivating microbes on the surface.

Referring in general to FIGS. 1-5, a system 100 for quantifying an exposure dose on surfaces is disclosed, in accordance with one or more embodiments of the disclosure.

Referring to FIG. 1, the system 100 may include one or more light sources 102. For example, the system 100 may include one or more far UV light sources 102. For instance, the system 100 may include one or more far UV light sources 102 capable of emitting one or more beams 201 of 222 nm light onto one or more surfaces 200.

Figure 2:
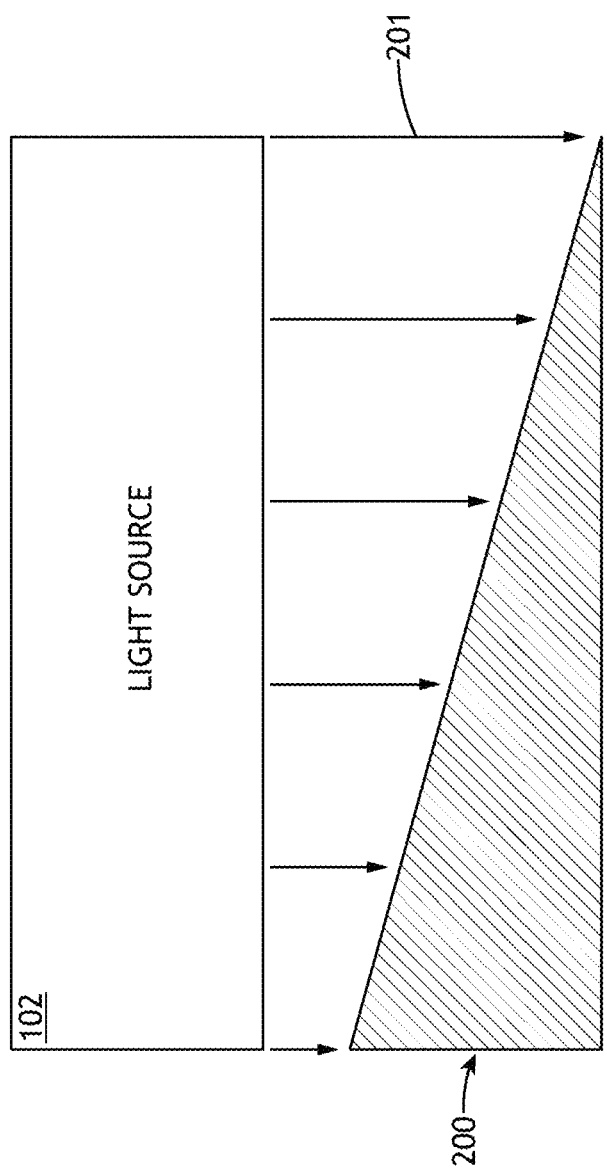
FIG. 2 illustrates a simplified schematic of a light source and surface of the system, in accordance with one or more embodiments of the disclosure.

As shown in FIG. 2, as the distance between the light source 102 and the surface 200 increases, the exposure dose level decreases. The system 100 may be configured to calculate an exposure dose for each surface 200 based on the amount of light 201 that hits the surface 200.

The one or more surfaces 200 may include any non-porous or porous surface. For example, the one or more surfaces 200 may include any non-porous or porous surface within an aircraft cabin. For instance, the one or more surfaces 200 may include, but are not limited to, one or more aircraft seats, one or more lavatory surfaces, one or more monuments within the aircraft (e.g., galley monuments, passenger suite monuments, or the like), or the like.

Figure 3:
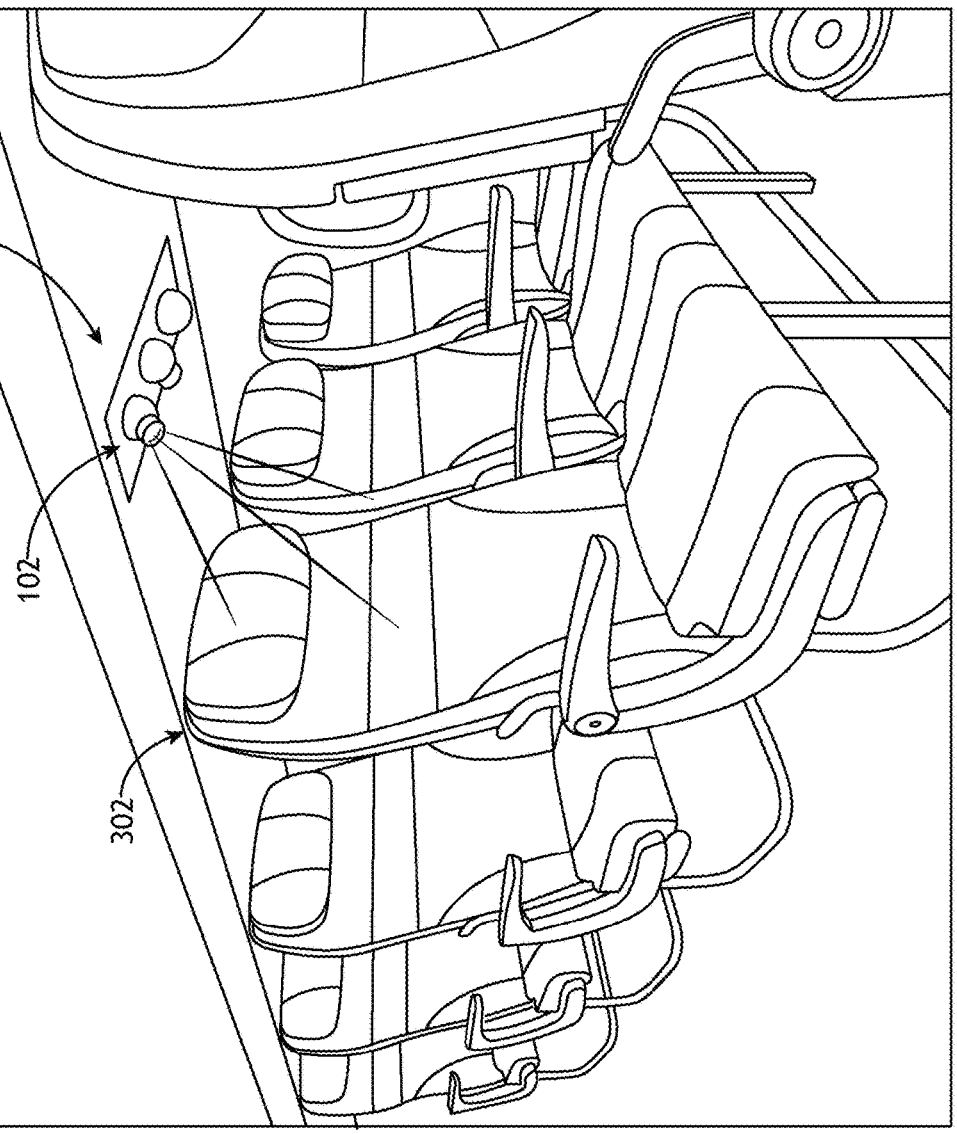
FIG. 3 illustrates an example implementation of the system within an aircraft cabin, in accordance with one or more embodiments of the disclosure.
Figure 4:
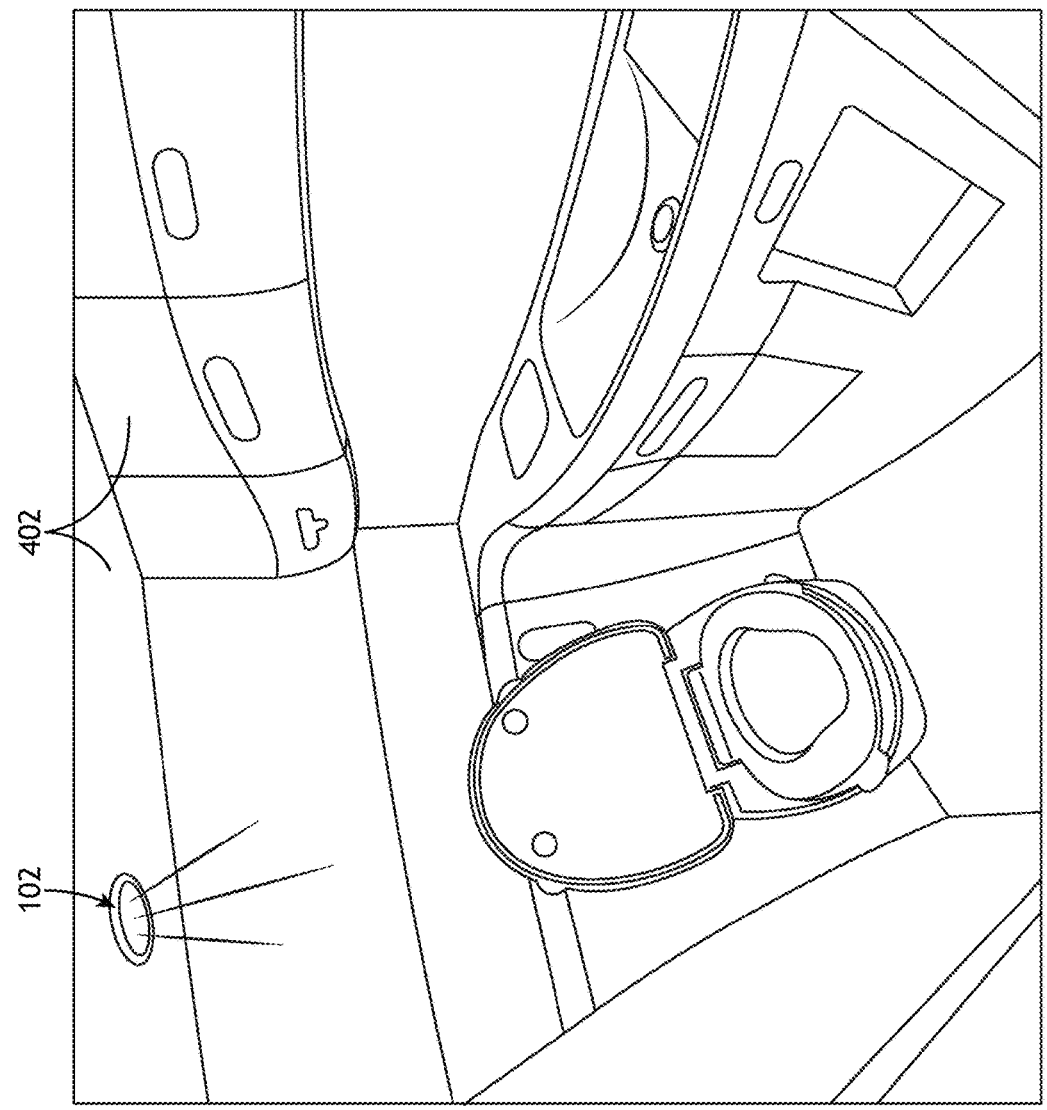
FIG. 4 illustrates an example implementation of the system within an aircraft cabin, in accordance with one or more embodiments of the disclosure.

In some embodiments, the one or more far UV light sources 102 may be integrated with (or fixed to) a component of an aircraft cabin. For example, as shown in FIG. 3, the one or more far UV light sources 102 may be integrated with an aircraft seat 302 of an aircraft cabin 300. For example, the one or more far UV light sources 102 may be installed in an overhead portion 304 of the aircraft seat 302. In this regard, an exposure dose for the one or more surfaces of the aircraft seat 302 (or the surrounding area) may be determined to ensure that an adequate dose of light is hitting the desired surfaces of the aircraft seat 302 (or the surrounding area). By way of another example, as shown in FIG. 4, the one or more far UV light sources 102 may be integrated with a lavatory 400 of an aircraft cabin. For example, the one or more far UV light sources 102 may be installed in one or more overhead portions 402 of the lavatory 400. In this regard, an exposure dose for the one or more surfaces of the lavatory may be determined to ensure that an adequate dose of light is hitting the desired surfaces of the lavatory.

Although FIGS. 3-4 depict the light source 102 installed within a specific location within the aircraft cabin, it is noted that the light source 102 may be installed within any location within the aircraft cabin.

In some embodiments, the one or more far UV light sources 102 may be separate from the aircraft cabin. For example, the one or more far UV light sources 102 may be one or more handheld far UV light sources.

The system 100 may include one or more image detection devices 104. For example, the one or more image detection devices 104 may be configured to capture one or more images 101 of a surface. Further, the one or more image detection devices 104 may provide the one or more images 101 to one or more controllers 106 to determine an exposure dose for the surface based on the one or more images 101 of the surface 200. By way of another example, the one or more image detection devices 104 may be configured to capture one or more video streams of a surface, where one or more images may be generated based on the one or more video streams.

It is noted that the one or more image detection devices 104 may include any type of image detection device suitable for capturing one or more images 101 of a surface 200. For example, the one or more image detection devices 104 may include one or more cameras. In one instance, the one or more image detection devices 104 may include one or more portable devices with imaging capabilities (e.g., a mobile device/tablet/laptop with an integrated camera). In another instance, the one or more image detection devices 104 may include one or more handheld (or standalone) cameras.

The surface 200 may be coated with one or more coatings. For example, the surface may be coated with one or more fluorescent coatings. It is noted that while the applied fluorescent coatings may be imperceptible (invisible) under normal visible light (e.g., and therefore may not present as a "stain"), the fluorescent coatings may fluoresce under a specific wavelength of light (e.g., 222 nm far UV light). For example, when the one or more beams of 222 nm are emitted from the one or more far UV light sources 102, the coated surface may fluoresce (e.g., glow a specific color). It is noted that the fluorescent coating will fluoresce (or glow) as a function of how close the surface is from the light source. For example, as the distance between the light source and the surface increase, the fluorescent coating will fluoresce (or glow) less.

Referring to FIG. 3, the glowing percentage of the fluorescent coating on the surface may be used to determine an exposure dose (mj/cm$^2$) of the surface. For example, the captured image of the surface may be used to correlate the glowing percentage of the fluorescent coating on the surface and an exposure dose.

For example, the one or more controllers 106 may be configured to adjust one or more image characteristics of the one or more images based on one or more image filtering methods. The one or more image filtering methods may include, but is not limited to, hue, brightness, saturation, and the like. In one instance, the one or more filter criteria may include hue (e.g., wavelength). In this regard, hue may be used as a filter to select a desired color or combination of colors, such that hue may tune into the color of the one or more coatings/dyes (e.g., blue). In another instance, the one or more filter criteria may include brightness. In this regard, brightness may be used as a filter (along with hue) to get a desired color. Thus, brightness may be used to determine the exposure dose, such that the brighter areas will equal a high exposure dose.

Figure 5:
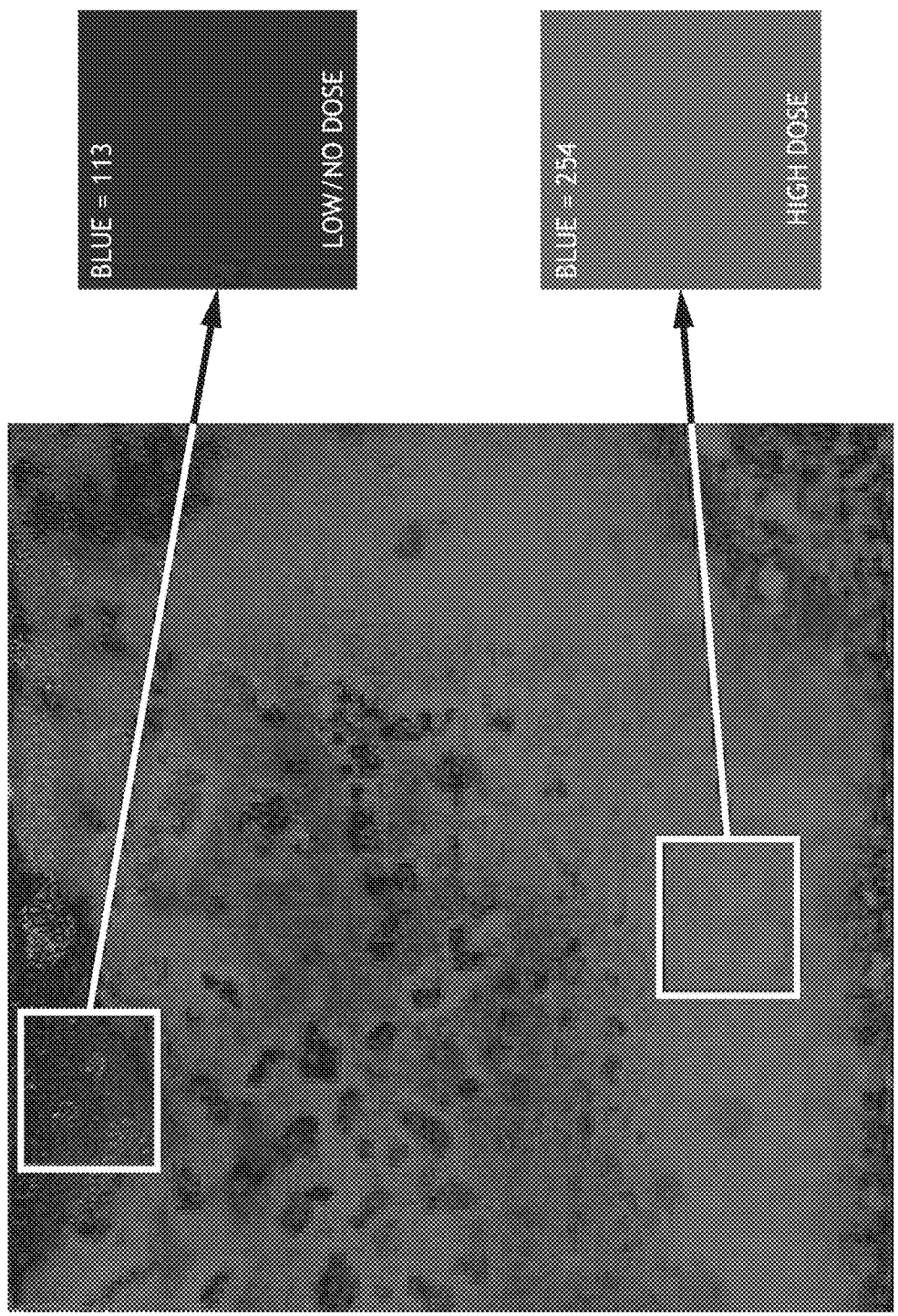
FIG. 5 illustrates an example graphical user interface, in accordance with one or more embodiments of the disclosure.

By way of another example, the one or more controllers 106 may be configured to generate a histogram of the adjusted one or more images based on the one or more filtering methods. For example, a histogram 500 (as shown in FIG. 5) may be generated based on at least one of hue, brightness, or saturation.

By way of another example, the one or more controllers 106 may be configured to determine a pixel surface area of the generated histogram. For example, the generated histogram may be filtered based on one or more desired properties (e.g., a specific exposure dose (mJ/cm$^2$)) to isolate the pixels in the image.

By way of another example, the one or more controllers 106 may be configured to calculate an exposure dose based on the determined pixel surface area and a calibration curve. For example, a meter may be used to determine the brightness for a specific exposure dose (e.g., 0.5 mJ/cm$^2$, 1.0 mJ/cm$^2$, or the like) to generate the calibration curve. For instance, the determined brightness for the specific exposure doses may be used to generate a calibration curve (e.g., brightness v. dose calibration curve). In this regard, the one or more controllers may be configured to assign one or more regions of the image one or more exposure doses based on one or more image characteristics (e.g., color). A first region having a first image characteristic (e.g., red area) may be assigned a first predetermined exposure dose, a second region having a second image characteristic (different than the first) may be assigned a second predetermined exposure dose (different than the first), a third region having a third image characteristic may be assigned a third predetermined exposure dose, and so on. For example, in a non-limiting example, a "red" area may have an exposure dose below 0.5 mJ/cm$^2$, a "yellow" area may have an exposure dose between 0.5-1.0 mJ/cm$^2$, and a "green" area may have an exposure dose greater than 1.0 mJ/cm$^2$. It is noted that the one or more colors may include any color.

The system 100 may include one or more controllers 106 including one or more processors 108 and memory 110. The memory 110 may include one or more program instructions configured to cause the one or more processors 108 to carry out various steps of the present disclosure. For example, the program instructions may be configured to cause the one or more processors 108 to perform one or more image analysis steps on the one or more captured images from the image detection device 104. By way of another example, the program instructions may be configured to cause the one or more processors 108 to determine an exposure dose for the surface based on the one or more image analysis steps.

The system 100 may further include a user interface communicatively coupled to the one or more controllers 106. The user interface may include a user input device and a display. The user input device may be configured to receive one or more input commands from a user, the one or more input commands may be configured to input data into the system. The user interface may include, but is not limited to, one or more desktops, tablets, smartphones, smart watches, or the like. In another embodiment, the user interface includes a display used to display data of the system 100 to a user. The display of the user interface may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in the present disclosure. A user may input selections and/or instructions responsive to data displayed to the user via a user input device of the user interface.

It is noted herein that the one or more components of system 100 may be communicatively coupled to the various other components of system 100 in any manner known in the art. For example, the one or more processors 108 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 106 may be communicatively coupled to one or more components of system 100 via any wireline or wireless connection known in the art.

The one or more processors 108 may include any one or more processing elements known in the art. In this sense, the one or more processors 108 may include any microprocessor device configured to execute algorithms and/or program instructions. In general, the term "processor" may be broadly defined to encompass any device having one or more processing elements, which execute a set of program instructions from a non-transitory memory medium (e.g., the memory 110), where the one or more sets of program instructions are configured to cause the one or more processors 106 to carry out any of one or more process steps.

The memory 110 may include any storage medium known in the art suitable for storing the one or more sets of program instructions executable by the associated one or more processors 108. For example, the memory 110 may include a non-transitory memory medium. For instance, the memory 110 may include, but is not limited to, a read-only memory (ROM), a random access memory (RAM), a magnetic or optical memory device (e.g., disk), a magnetic tape, a solid state drive, and the like. The memory 110 may be configured to provide display information to the user device. In addition, the memory 110 may be configured to store user input information from one or more user input devices. The memory 110 may be housed in a common controller housing with the one or more processors 108. The memory 110 may, alternatively or in addition, be located remotely with respect to the spatial location of the processors 108 and/or the one or more controllers 106. For instance, the one or more processors 108, the one or more controllers 106 may access a remote database, accessible through a network (e.g., internet, intranet, and the like) via one or more communication interfaces.

The one or more communication interfaces may be operatively configured to communicate with one or more components of the one or more controllers 106 and/or the one or more components of the system. For example, the one or more communication interfaces may also be coupled (e.g., physically, electrically, and/or communicatively) with the one or more processors 108 to facilitate data transfer between components of the one or more components of the one or more controllers 106 and/or the one or more components of the system 100 and the one or more processors 108. For instance, the one or more communication interfaces may be configured to retrieve data from the one or more processors 108, or other devices, transmit data for storage in the memory 110, retrieve data from storage in the memory 110, or the like.

It is noted that the one or more controllers 106 may be housed in a common housing of the image detection device 104 or light source 102 or housed external. As such, FIG. 1 is provided merely for illustrative purposes and shall not be construed as limiting the scope of the present disclosure.

Figure 6:
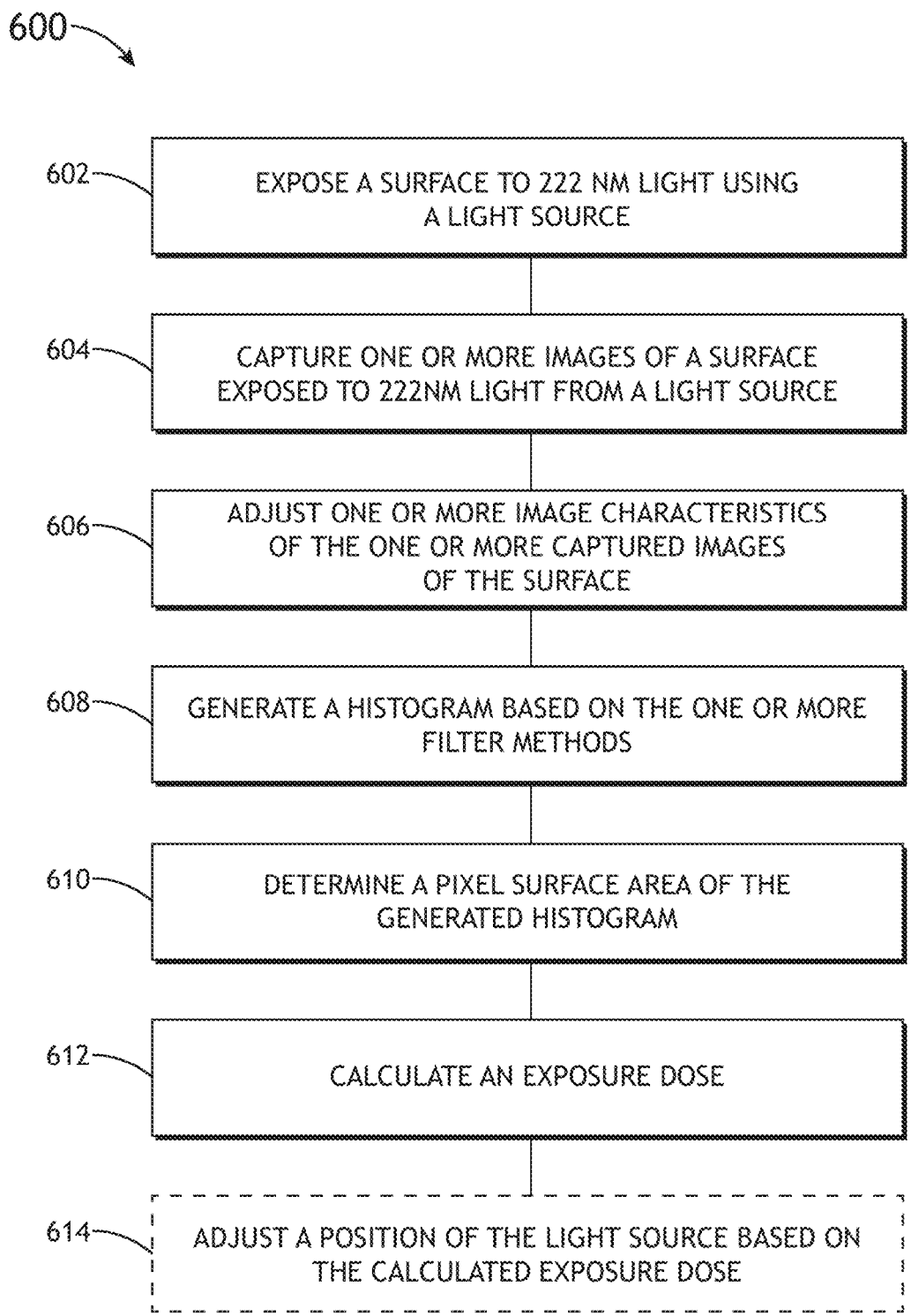
FIG. 6 illustrates a flowchart depicting a method or process for quantifying an exposure dose on surfaces, in accordance with one or more embodiments of the disclosure.

FIG. 6 illustrates a flowchart depicting a method or process 600 for quantifying an exposure dose on surfaces, in accordance with one or more embodiments of the disclosure.

In a step 602, one or more surfaces may be exposed to 222 nm light. For example, the one or more light sources 102 may be configured to emit one or more beams of 222 nm light onto the surface. For instance, the one or more surfaces may be coated with the one or more fluorescent coatings, such that when the one or more surfaces are exposed to the 222 nm light, the one or more or more surfaces to fluoresce (e.g., glow a specific color).

In a step 604, one or more images of the surface may be captured. For example, the one or more image detection devices 104 may be configured to capture one or more images of the surface. In one instance, one or more images 101 of an aircraft seat may be captured. In another instance, one or more images 101 of a lavatory may be captured.

In a step 606, one or more image characteristics of the one or more images may be adjusted based on one or more image filtering methods. The one or more image filtering methods may include, but is not limited to, hue, brightness, saturation, and the like. For example, the one or more controllers 106 may be configured to adjust one or more image characteristics based on one or more image filtering methods (e.g., hue, brightness, saturation, or the like). In one instance, the one or more filter criteria may include hue (e.g., wavelength). In this regard, hue may be used as a filter to select a desired color or combination of colors, such that hue may tune into the color of the one or more coatings/dyes (e.g., blue). In another instance, the one or more filter criteria may include brightness. In this regard, brightness may be used as a filter (along with hue) to get a desired color. Thus, brightness may be used to determine the exposure dose, such that the brighter areas will equal a high exposure dose.

In a step 608, a histogram may be generated. For example, the one or more controllers 106 may be configured to generate a histogram (such as the histogram 500 shown in FIG. 5) based on the adjusted image. For instance, the generated histogram may be filtered based one or more desired properties (e.g., a specific exposure dose (mJ/cm$^2$)) to isolate the pixels in the image.

In a step 610, a pixel surface area of the generated histogram may be determined. For example, the one or more controllers 106 may be configured to determine the pixel surface area.

In a step 612, an exposure dose for the surface may be calculated. For example, the one or more controllers 106 may be configured to calculate an exposure dose. For example, a meter may be used to determine the brightness for a specific exposure dose (e.g., 0.5 mJ/cm$^2$, 1.0 mJ/cm$^2$, or the like) to generate the calibration curve. For instance, the determined brightness for the specific exposure doses may be used to generate a calibration curve (e.g., brightness v. dose calibration curve). In this regard, the one or more controllers may be configured to assign one or more regions of the image one or more exposure doses based on one or more image characteristics (e.g., color). A first region having a first image characteristic (e.g., red area) may be assigned a first predetermined exposure dose, a second region having a second image characteristic (different than the first) may be assigned a second predetermined exposure dose (different than the first), a third region having a third image characteristic may be assigned a third predetermined exposure dose, and so on. For example, in a non-limiting example, a "red" area may have an exposure dose below 0.5 mJ/cm$^2$, a "yellow" area may have an exposure dose between 0.5-1.0 mJ/cm$^2$, and a "green" area may have an exposure dose greater than 1.0 mJ/cm$^2$. It is noted that the one or more colors may include any color.

In an optional step 614, a position of the light source may be adjusted based on the calculated exposure dose. For example, an angle of the light source 102 may be adjusted based on the calculated exposure dose. For instance, the light source 102 may be tuned such that a predetermined amount of light hits the desired surface, such that the exposure dose is high enough to be effective at deactivating microbes on the desired surface.

It is noted the method or process 600 is not limited to the steps and/or sub-steps provided. The method or process 600 may include more or fewer steps and/or sub-steps. In addition, the method or process 600 may perform the steps and/or sub-steps simultaneously. Further, the method or process 600 may perform the steps and/or sub-steps sequentially, including in the order provided or an order other than provided. Therefore, the above description should not be interpreted as a limitation on the scope of the disclosure but merely an illustration.

Although embodiments of the disclosure illustrate the system 100 being integrated within an aircraft cabin, it is noted, however, that the system 100 and/or components of the system 100 are not limited to the aviation environment and/or the aircraft components within the aviation environment. For example, the system 100 and/or components of the system 100 may be configured for any type of vehicle known in the art. For instance, the vehicle may be any air, space, land, or water-based personal equipment or vehicle;

any air, space, land, or water-based commercial equipment or vehicle; any air, space, land, or water-based military equipment or vehicle known in the art. By way of another example, the system 100 and/or components of the system 100 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for quantifying an exposure dose on a surface, the system comprising:
   one or more far ultraviolet (UV) light sources configured to emit one or more beams of 222 nm light onto the surface, the surface being coated with one or more fluorescent coatings;
   one or more image detection devices configured to capture one or more images of the surface when the one or more beams of 222 nm light from the one or more far UV light sources hit the surface; and
   one or more controllers communicatively coupled to the one or more image detection devices, the one or more controllers including one or more processors and memory, the one or more processors including a set of program instructions stored in memory, the set of program instructions configured to cause the one or more processors to:
     adjust one or more image characteristics for the one or more captured images using one or more filtering methods;
     generate a histogram of the one or more adjusted images based on the one or more filtering methods;
     determine a pixel surface area for the generated histogram; and
     calculate the exposure dose for the surface based on the generated pixel surface area and a predetermined calibration curve, wherein the predetermined calibration curve is generated using a meter device.

2. The system of claim 1, wherein the one or more filtering methods include adjusting at least one of:
   brightness, saturation, or hue.

3. The system of claim 1, wherein the one or more light sources are integrated with a portion of an aircraft cabin.

4. The system of claim 3, wherein the one or more light sources are integrated with a portion of a lavatory of the aircraft cabin.

5. The system of claim 3, wherein the one or more light sources are integrated with an overhead portion above an aircraft seat of the aircraft cabin.

6. The system of claim 1, wherein the one or more image detection devices include one or more cameras.

7. The system of claim 6, wherein the one or more cameras include one or more mobile device cameras.

8. A method for quantifying an exposure dose for a surface, the method comprising:
   emitting one or more beams of 222 nm light onto a portion of the surface using one or more far ultraviolet (UV) light sources capable of emitting 222 nm light, the portion of the surface being coated with one or more fluorescent coatings;
   capturing one or more images of the portion of the surface;
   adjusting one or more image characteristics for the one or more captured images using one or more filtering methods;
   generating a histogram of the one or more adjusted images based on the one or more filtering methods;
   determining a pixel surface area for the generated histogram; and
   calculating the exposure dose for the surface based on the generated pixel surface area and a predetermined calibration curve, wherein the predetermined calibration curve is generated using a meter device.

9. The method of claim 8, wherein the one or more filtering methods include adjusting at least one of:
   brightness, saturation, or hue.

10. The method of claim 8, further comprising:
    adjusting a position of at least one of the one or more light sources based on the calculated exposure dose.

11. The method of claim 8, wherein the one or more light sources are integrated with a portion of an aircraft cabin.

12. The method of claim 11, wherein the one or more light sources are integrated with a portion of a lavatory of the aircraft cabin.

13. The method of claim 11, wherein the one or more light sources are integrated with an overhead portion above an aircraft seat of the aircraft cabin.

* * * * *